No. 697,677. Patented Apr. 15, 1902.
G. W. SHERER.
ICE CREAM DISHER.
(Application filed July 22, 1901.)
(No Model.)
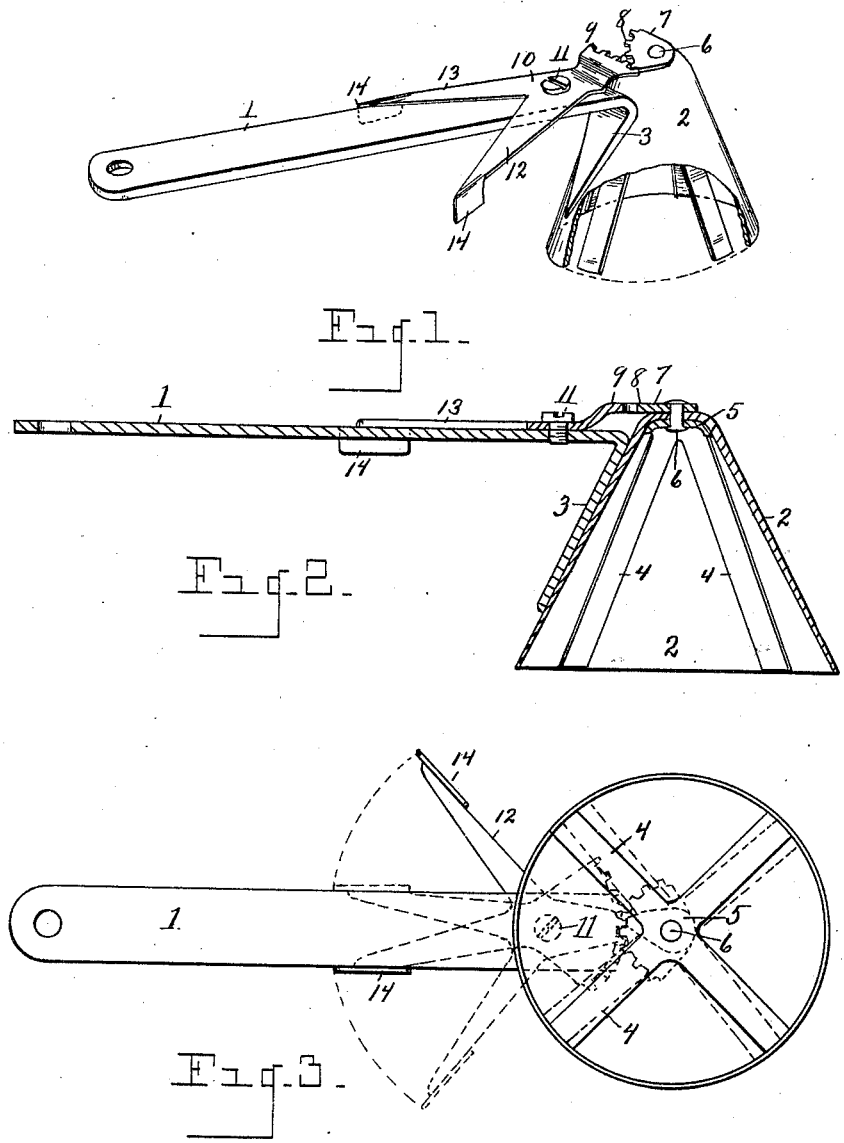

UNITED STATES PATENT OFFICE.

GEORGE W. SHERER, OF ROCKFORD, ILLINOIS, ASSIGNOR TO ANNA B. SHERER, OF ROCKFORD, ILLINOIS.

ICE-CREAM DISHER.

SPECIFICATION forming part of Letters Patent No. 697,677, dated April 15, 1902.

Application filed July 22, 1901. Serial No. 69,191. (No model.)

*To all whom it may concern:*

Be it known that I, GEORGE W. SHERER, a citizen of the United States, residing at Rockford, in the county of Winnebago, State of Illinois, have invented certain new and useful Improvements in Ice-Cream Dishers; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to an ice-cream disher; and it consists in the construction and arrangement of parts hereinafter fully set forth, and pointed out more particularly in the claim.

The object of the invention is to provide simple and efficient means for quickly and easily discharging the ice-cream from the conical bowl or cup of the disher, so as to prevent the cream from adhering to the above and preserve the conical shape given to the cream by the bowl of the disher.

The above object is attained by the device illustrated in the accompanying drawings, in which—

Figure 1 is a perspective view of my improved device, a part of the bowl being broken away. Fig. 2 is a sectional view through the bowl and longitudinally of the handle. Fig. 3 is an inverted plan.

Referring to the characters of reference, 1 designates a handle of any suitable material, one end of which is turned downwardly and brazed or otherwise secured to the bowl 2 of the disher, as shown at 3. The bowl 2 may be of any suitable shape, but is herein shown conical, and may be made of various sizes in order to serve the cream in any quantity desired. Said bowl is preferably stamped from sheet metal, and the bowl and handle may be given any desired finish.

Within the bowl 2 are a number of thin metal blades 4, which lie closely to the inner wall of the bowl and are united at their upper ends by a web portion 5, through which passes a bolt or rivet 6, journaled in the apex of the conical bowl. Secured to the upper end of the bolt 6 is a segmental gear 7, having teeth 8, adapted to mesh with the teeth 9 of a segment of gear on the end of the forked lever 10, pivoted at 11 to the upper face of the handle 1, the forks 12 and 13 of said lever extending on opposite sides of the handle and having the thumb and finger plates 14 on the outer ends thereof. By pressing the distended fork of the lever inwardly toward the handle said lever is swung upon its pivot and a movement is imparted to the gear-segment on the end thereof, which imparts a partial rotation to the gear-segment 7, thereby causing the blades 4 within the bowl to sweep the inner face of said bowl a distance equal to the space between said blades, whereby the whole inner surface of the bowl is traversed by said blades and the contents of the bowl is completely severed from the wall thereof and is caused to drop freely therefrom.

In the operation of this device the bowl is dipped full of cream and then held over a dish into which the cream is to be served, when with the thumb or the finger the distended fork of the lever is pressed inwardly and the blades rotated to cut the cream free from the bowl, when it drops into the dish. The inward movement of one fork of the lever distends the opposite fork, so as to place the device in condition for a succeeding operation by merely pressing inwardly the fork of the lever last distended when the bowl has been again filled. It will therefore be seen that one operation of the device automatically restores the apparatus for a succeeding operation, the operative parts being alternately reversed in their movement, making the device very simple, yet perfect and efficient in its operation.

The thumb and finger plates 13 and 14 on the ends of the bifurcated lever serve as stops which engage the opposite edges of the handle and arrest said lever at the limit of its movement in both directions to prevent its ends from swinging past the handle in the operation of the device.

Having thus fully set forth my invention, what I claim as new, and desire to secure by Letters Patent, is—

In a device for the purpose set forth, the combination with the bowl and handle, of a series of blades pivoted within the bowl and adapted to sweep the inner wall thereof, a gear-segment on the journal of said blades, a bifurcated lever pivoted to the upper face of the handle having the sides of its fork extending either side of the handle, said fork carrying a gear-segment on the stem thereof which meshes with the gear-segment of the blades and having depending plates on the ends of the fork sides adapted to engage the opposite edges of the handle to arrest the movement of said lever in both directions.

In testimony whereof I sign this specification in the presence of two witnesses.

GEORGE W. SHERER.

Witnesses:
ESTHER WENSTROM,
JAMES G. TETLOW.